United States Patent [19]

Asoma

[11] Patent Number: 4,537,472
[45] Date of Patent: Aug. 27, 1985

[54] OBJECTIVE LENS SYSTEM FOR MICROSCOPES

[75] Inventor: Yoshito Asoma, Nagano, Japan

[73] Assignee: Olympus Optical Co., Ltd., Tokyo, Japan

[21] Appl. No.: 577,336

[22] Filed: Feb. 6, 1984

[30] Foreign Application Priority Data

Feb. 15, 1983 [JP] Japan .................. 58-22162

[51] Int. Cl.³ .................. G02B 9/62; G02B 21/02
[52] U.S. Cl. .................. 350/414; 350/464
[58] Field of Search .................. 350/464, 414

[56] References Cited

U.S. PATENT DOCUMENTS

| 3,530,436 | 9/1970 | Bertele et al. | 350/414 |
| 3,700,311 | 10/1972 | Shoemaker | 350/414 |
| 3,746,428 | 7/1973 | Shoemaker | 350/414 |
| 4,373,785 | 2/1983 | Shoemaker | 350/414 |
| 4,376,570 | 3/1983 | Sussman | 350/414 |

FOREIGN PATENT DOCUMENTS

| 553570 | 6/1977 | U.S.S.R. | 350/414 |
| 584274 | 1/1978 | U.S.S.R. | 350/414 |

Primary Examiner—John K. Corbin
Assistant Examiner—Scott J. Sugarman

[57] ABSTRACT

An objective lens system for microscopes designed for a magnification level of 60X and NA of 1.4, excellent in contrast and resolution, and comprising a first cemented doublet component comprising a plano-convex lens element and a meniscus lens element having a strongly concave surface on the object side, a second meniscus lens component, a third cemented component comprising a convex lens element, a concave lens element and a convex lens element, a fourth cemented component comprising a negative meniscus lens element, a biconvex lens element and a negative lens element, a fifth cemented doublet component having a strongly concave surface on the image side and a sixth cemented doublet component having a strongly concave surface on the object side.

3 Claims, 3 Drawing Figures

OBJECTIVE LENS SYSTEM FOR MICROSCOPES

BACKGROUND OF THE INVENTION (a) Field of the Invention

The present invention relates to an apochromat grade of objective lens system for microscopes designed for a magnification level of 60× and an NA of 1.4.

(b) Description of the Prior Art

As a conventional example of an objective lens system for microscopes which is relatively similar to that according to the present invention, we can mention the one disclosed by U.S. Pat. No. 3,700,311. This objective lens system for microscopes is designed for a magnification level on the order of 100×, and similar to that according to the present invention in two points: that it adopts an embed doublet (a doublet comprising a lens element embedded in an end surface of another lens element having a larger diameter in the vicinity of the optical axis) as the first lens component and that it selects that Gauss type of lens composition for the image side of said lens system. However, this lens system is designed for NA of 1.3 and comprises eight lens components which have numerous surfaces in contact with air and degrade image contrast. Further, this objective lens system for microscopes is designed for infinite distance (to form an object image at infinite diatance).

SUMMARY OF THE INVENTION

A general object of the present invention is to provide an oil-immersed type of objective lens system for microscopes designed for a magnification level of 60× and an NA of 1.4, and excellent in contrast and resolution.

The objective lens system for microscopes according to the present invention has the composition illustrated in FIG. 1. Speaking concretely, the lens system according to the present invention comprises six lens components: a first cemented doublet component comprising a planoconvex lens element and a meniscus lens element having a strongly concave surface on the object side, a second meniscus lens component, a third cemented component comprising a positive lens element, a negative lens element and a positive lens element, and has a biconvex form as a whole, a fourth cemented component comprising a negative meniscus lens element, a biconvex lens element and a negative lens element, fifth cemented doublet component having a strongly concave surface on the image side, and a sixth lens component having a strongly concave surface on the object side.

Further, the lens system according to the present invention satisfies the following conditions (1) through (6):

$$-0.1 < f/f_2 < 0.05 \tag{1}$$

$$-0.1 < f/f_B < -0.07 \tag{2}$$

$$1.75 < n_2 \tag{3}$$

$$29 < \nu_5 < 45 \tag{4}$$

$$60 < \nu_6, \nu_8 \tag{5}$$

$$d_{16} < 1.2f \tag{6}$$

wherein the reference symbols are defined as follows:

f: focal length of the lens system as a whole
$f_2$: focal length of the image side lens element of the first lens component
$f_B$: composite focal length of the fifth and six lens components as a whole
$n_2$: refractive index of the image side lens element of the first lens component
$\nu_5$ and $\nu_6$: Abbe's numbers of the middle negative lens element and the image side lens element respectively of the third lens component
$\nu_8$: Abbe's number of the middle lens element of the fourth lens component
$d_{16}$: airspace reserved between the fifth and sixth lens components.

As already described above, the objective lens system for microscopes according to the present invention is characterized in that it adopts the first lens component designed as so-called embed doublet, and the fifth and sixth lens components as a whole having the Gauss type of composition mainly for the purpose of correcting curvature of field. If it is attempted to sufficiently correct curvature of field only with the first lens component, it will have strongly negative refractive power, and the second and subsequent lens components must have large diameters accordingly. On the other hand, curvature of field cannot be corrected sufficiently only with the Gauss type of the fifth and sixth lens components. In view of these facts, the present invention selects the lens composition descrived above.

Further, in the third cemented component comprising three lens elements, the two lens element arranged on the object side are designed as hyperchromatic elements which correct curvature of chromatic aberration of spherical aberration.

Now, significance of the above-mentioned conditions will be described below:

The condition (1) is necessary for correcting curvature of field to an adequate degree. If the upper limit of this condition is exceeded, curvature of field will be undercorrected. If the lower limit of this condition is exceeded, in contrast, curvature of field will be corrected but the second and subsequent lens components will have too large diameters, thereby making designing of the frame inconvenient and allowing only a small number of lens components to be within a definite lens barrel length range.

The condition (2) is adopted also for correcting curvature of field. If the lower limit of the condition (2) is exceeded, curvature of field will be undercorrected. If the upper limit of the condition (2) is exceeded, in contrast, curvature of field will be corrected but offaxial aberrations will hardly be corrected. Speaking concretely, $|r_{16}|$ and $|r_{17}|$ ($r_{16}$ represents radius of curvature on the image side surface of the fifth lens component and $r_{17}$ designates radius of curvature on the object side surface of the sixth lens component) will be minimized relatively and therefore have too strong negative functions for offaxial rays having a large NA.

The condition (3) is necessary for correcting curvature of field and high-order spherical aberrations. If the condition (3) is not satisfied, curvature of field and high-order spherical aberrations will be aggravate.

The condition (4) is adopted for correcting curvature of chromatic aberration of spherical aberration. If this condition is not satisfied, chromatic aberration due to rays having a large NA will not be corrected though longitudinal chromatic aberration due to paraxial rays and lateral chromatic aberration can be corrected. If the upper limit of the condition (4) is exceeded, the F and g lines will be curved on the negative side. If the lower limit of the condition (4) is exceeded, in contrast, the F and g lines will be curved on the positive side.

In order to minimize the secondary spectrum of longitudinal chromatic aberration in the entire lens system, glass materials of the image side positive lens element of the third lens component and the middle positive lens element of the fourth lens component must satisfy the condition (5) and further have strongly anomalous dispersion. If $\nu_6$ and $\nu_8$ deviate from the range defined by the condition (5), it will be difficult to correct the secondary spectrum.

The condition (6) is adopted for correcting coma. If the upper limit of the condition (6) is exceeded, coma will be remarkably asymmetrical. A smaller value of $d_{16}$ is more desirable for correcting coma. However, a value of $d_{16}$ smaller than the lower limit of the condition (6) is undesirable since it will bring the fifth lens component into contact with the sixth lens component.

DETAILED DESCRIPTION OF THE PREFERRED EMBODIMENTS

Figure 1:
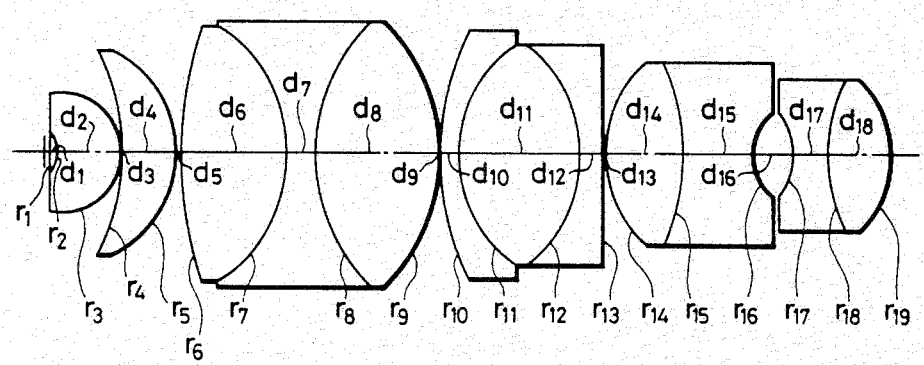
FIG. 1 shows a sectional view illustrating the composition of the objective lens system for microscopes according to the present invention.
Figure 2:
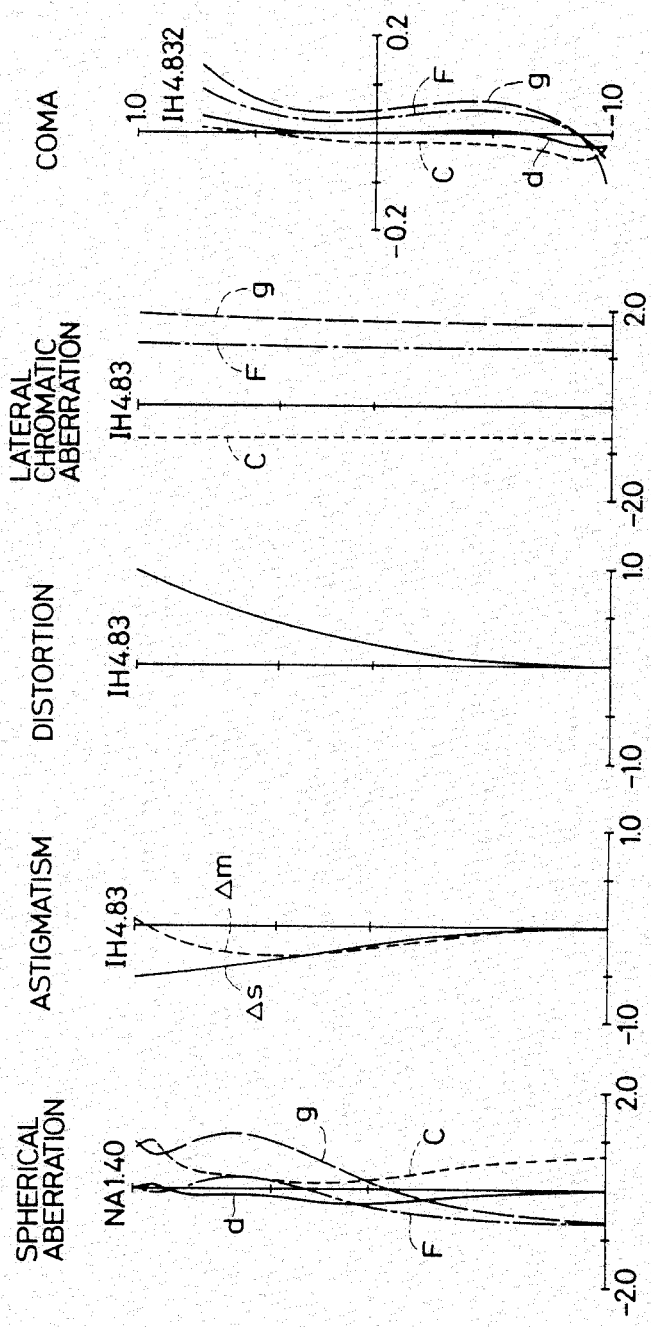
FIG. 2 shows curves illustrating aberration characteristics of Embodiment 1 of the present invention.
Figure 3:
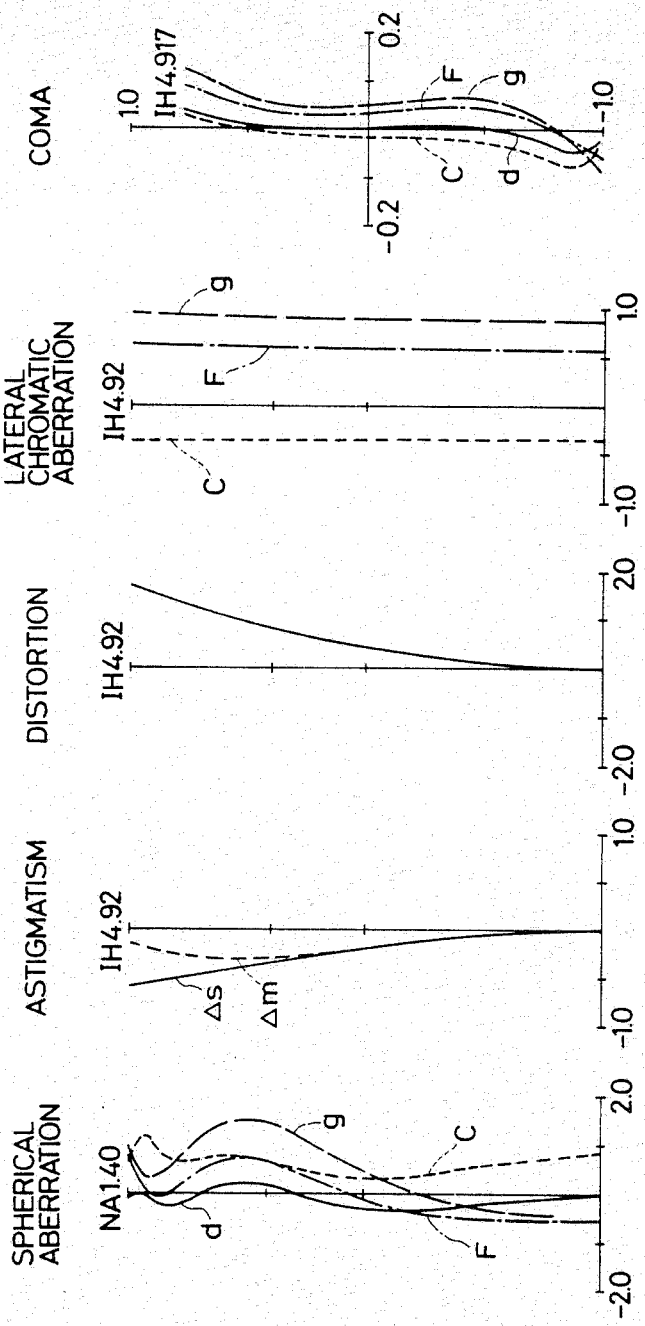
FIG. 3 shows curves illustrating aberration characteristics of Embodiment 2 of the present invention.

Now, numerical data will be described as preferred embodiments of the objective lens system for microscopes according to the present invention, Embodiment 1

$r_1 = \infty$
$d_1 = 0.211$, $n_1 = 1.51633$, $\nu_1 = 64.2$
$r_2 = -0.625$
$d_2 = 1.334$, $n_2 = 1.883$, $\nu_2 = 40.8$
$r_3 = -1.222$
$d_3 = 0.029$
$r_4 = -4.049$
$d_4 = 1.073$, $n_3 = 1.617$, $\nu_3 = 62.8$
$r_5 = -2.210$
$d_5 = 0.036$
$r_6 = 8.517$
$d_6 = 2.146$, $n_4 = 1.6583$, $\nu_4 = 57.3$
$r_7 = -2.834$
$d_7 = 0.540$, $n_5 = 1.65412$, $\nu_5 = 39.7$
$r_8 = 3.772$
$d_8 = 2.396$, $n_6 = 1.43389$, $\nu_6 = 95.2$
$r_9 = -3.777$
$d_9 = 0.043$
$r_{10} = 5.511$
$d_{10} = 0.501$, $n_7 = 1.6134$, $\nu_7 = 43.8$
$r_{11} = 2.650$
$d_{11} = 2.504$, $n_8 = 1.43389$, $\nu_8 = 95.2$
$r_{12} = -2.655$
$d_{12} = 0.422$, $n_9 = 1.52682$, $\nu_9 = 51.1$
$r_{13} = 3690.551$
$d_{13} = 0.036$
$r_{14} = 2.302$
$d_{14} = 1.538$, $n_{10} = 1.497$, $\nu_{10} = 81.6$
$r_{15} = -4.982$
$d_{15} = 1.431$, $n_{11} = 1.52682$, $\nu_{11} = 51.1$
$r_{16} = 1.141$
$d_{16} = 0.787$
$r_{17} = -1.265$
$d_{17} = 0.715$, $n_{12} = 1.81554$, $\nu_{12} = 44.5$
$r_{18} = 3.806$
$d_{18} = 1.259$, $n_{13} = 1.7495$, $\nu_{13} = 35.3$
$r_{19} = -2.162$ -continued $f = 1$, $\beta = -60$, $NA = 1.4$
$1/f_2 = 0.0341$, $1/f_B = -0.0761$, $WD = 0.0465$ Embodiment 2

$r_1 = \infty$
$d_1 = 0.248$, $n_1 = 1.51633$, $\nu_1 = 64.2$
$r_2 = -0.593$
$d_2 = 1.369$, $n_2 = 1.883$, $\nu_2 = 40.8$
$r_3 = -1.302$
$d_3 = 0.031$
$r_4 = -3.358$
$d_4 = 1.150$, $n_3 = 1.617$, $\nu_3 = 62.8$
$r_5 = -2.215$
$d_5 = 0.037$
$r_6 = 6.734$
$d_6 = 2.416$, $n_4 = 1.651$, $\nu_4 = 56.2$
$r_7 = -3.288$
$d_7 = 0.573$, $n_5 = 1.6445$, $\nu_5 = 40.8$
$r_8 = 3.736$
$d_8 = 2.617$, $n_6 = 1.43389$, $\nu_6 = 95.2$
$r_9 = -4.388$
$d_9 = 0.044$
$r_{10} = 4.798$
$d_{10} = 0.475$, $n_7 = 1.71852$, $\nu_7 = 33.5$
$r_{11} = 2.662$
$d_{11} = 2.445$, $n_8 = 1.43389$, $\nu_8 = 95.2$
$r_{12} = -3.571$
$d_{12} = 0.438$, $n_9 = 1.5213$, $\nu_9 = 52.6$
$r_{13} = 101.671$
$d_{13} = 0.044$
$r_{14} = 2.436$
$d_{14} = 1.606$, $n_{10} = 1.497$, $\nu_{10} = 81.6$
$r_{15} = -5.282$
$d_{15} = 1.412$, $n_{11} = 1.5213$, $\nu_{11} = 52.6$
$r_{16} = 1.249$
$d_{16} = 0.912$
$r_{17} = -1.370$
$d_{17} = 0.376$, $n_{12} = 1.6968$, $\nu_{12} = 56.5$
$r_{18} = 3.782$
$d_{18} = 1.518$, $n_{13} = 1.5927$, $\nu_{13} = 35.3$
$r_{19} = -2.100$
$f = 1$, $\beta = -60$, $NA = 1.4$
$1/f_2 = -0.0765$, $1/f_B = -0.0835$, $WD = 0.043$ wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{13}$ denote refractive indices of the respective lens elements, the reference symbols $\nu_1$ through $\nu_{13}$ represent Abbe's numbers of the respective lens elements, the reference symbol $\beta$ designates magnification level of the objective lens system and the reference symbol WD denotes working distance of the objective lens system.

As is clear from the foregoing detailed descriptions and Embodiments, the objective lens system according to the present invention has a magnification level on the order of 60×, an NA of 1.4 and aberrations corrected favorably as shown in the aberration characteristic curves.

I claim:

1. An objective lens system for microscopes comprising a first cemented doublet component comprising a plano-convex lens element and a meniscus lens element having a strongly concave surface on the object side, a second meniscus lens component, a third cemented component comprising a positive lens element, a negative lens element and a positive lens element, a fourth cemented component comprising a negative meniscus lens elements, a biconvex lens element and a negative lens element, and a fifth cemented doublet component and a sixth cemented doublet component respectively having strongly concave surfaces opposite to each other, said lens system being so designed as to satisfy the following conditions (1) through (6):

$$-0.1 < f/f_2 < 0.05 \quad (1)$$

$$-0.1 < f/f_B < -0.07 \quad (2)$$

$$1.75 < n_2 \quad (3)$$

$$29 < \nu_5 < 45 \quad (4)$$

$$60 < \nu_6, \nu_8 \quad (5)$$

$$d_{16} < 1.2f \quad (6)$$

wherein the reference symbol f represents focal length of said objective lens system as a whole, the reference symbol $f_2$ designates focal length of the image side lens element of said first lens component, the reference symbol $f_B$ denotes composite focal length of said fifth and sixth lens components as a whole, the reference symbol $n_2$ represents refractive index of the image side lens element of said first lens component, the reference symbols $\nu_5$ and $\nu_6$ designate Abbe's numbers of the middle negative lens element and the image side lens element respectively of said third lens component, the rererence symbol $\nu_8$ denotes Abbe's number of the middle positive lens element of said fourth lens component and the reference symbol $d_{16}$ represents airspace reserved between said fifth and sixth lens components.

2. An objective lens system for microscopes according to claim 1 having the following numerical data:

| | | |
|---|---|---|
| $r_1 = \infty$ | | |
| $d_1 = 0.211$ | $n_1 = 1.51633$ | $\nu_1 = 64.2$ |
| $r_2 = -0.625$ | | |
| $d_2 = 1.334$ | $n_2 = 1.883$ | $\nu_2 = 40.8$ |
| $r_3 = -1.222$ | | |
| $d_3 = 0.029$ | | |
| $r_4 = -4.049$ | | |
| $d_4 = 1.073$ | $n_3 = 1.617$ | $\nu_3 = 62.8$ |
| $r_5 = -2.210$ | | |
| $d_5 = 0.036$ | | |
| $r_6 = 8.517$ | | |
| $d_6 = 2.146$ | $n_4 = 1.6583$ | $\nu_4 = 57.3$ |
| $r_7 = -2.834$ | | |
| $d_7 = 0.540$ | $n_5 = 1.65412$ | $\nu_5 = 39.7$ |
| $r_8 = 3.772$ | | |
| $d_8 = 3.296$ | $n_6 = 1.43389$ | $\nu_6 = 95.2$ |
| $r_9 = -3.777$ | | |
| $d_9 = 0.043$ | | |
| $r_{10} = 5.511$ | | |
| $d_{10} = 0.501$ | $n_7 = 1.6134$ | $\nu_7 = 43.8$ |
| $r_{11} = 2.650$ | | |
| $d_{11} = 2.504$ | $n_8 = 1.43389$ | $\nu_8 = 95.2$ |
| $r_{12} = -2.655$ | | |
| $d_{12} = 0.422$ | $n_9 = 1.52682$ | $\nu_9 = 51.1$ |
| $r_{13} = 3690.551$ | | |
| $d_{13} = 0.036$ | | |
| $r_{14} = 2.302$ | | |
| $d_{14} = 1.538$ | $n_{10} = 1.597$ | $\nu_{10} = 81.6$ |
| $r_{15} = -4.982$ | | |
| $d_{15} = 1.431$ | $n_{11} = 1.52682$ | $\nu_{11} = 51.1$ |
| $r_{16} = 1.141$ | | |
| $d_{16} = 0.787$ | | |
| $r_{17} = -1.265$ | | |
| $d_{17} = 0.715$ | $n_{12} = 1.81554$ | $\nu_{12} = 44.5$ |
| $r_{18} = 3.806$ | | |
| $d_{18} = 1.259$ | $n_{13} = 1.7495$ | $\nu_{13} = 35.3$ |
| $r_{19} = -2.162$ | | |
| $f = 1,$ | $\beta = -60,$ | $NA = 1.4$ |
| $1/f_2 = 0.0341,$ | $1/f_B = -0.0761,$ | $WD = 0.0465$ | wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{13}$ denote refractive indices of the respective lens elements, the reference symbols $\nu_1$ through $\nu_{13}$ represent Abbe's numbers of the respective lens elements, the reference symbol $\beta$ designates magnification level of said objective lens system as a whole and the reference symbol WD denotes working distance of said objective lens system as a whole.

3. An objective lens system for microscopes according to claim 1 having the following numerical data:

| | | |
|---|---|---|
| $r_1 = \infty$ | | |
| $d_1 = 0.248$ | $n_1 = 1.51633$ | $\nu_1 = 64.2$ |
| $r_2 = -0.593$ | | |
| $d_2 = 1.369$ | $n_2 = 1.883$ | $\nu_2 = 40.8$ |
| $r_3 = -1.302$ | | |
| $d_3 = 0.031$ | | |
| $r_4 = -3.358$ | | |
| $d_4 = 1.150$ | $n_3 = 1.617$ | $\nu_3 = 62.8$ |
| $r_5 = -2.215$ | | |
| $d_5 = 0.037$ | | |
| $r_6 = 6.734$ | | |
| $d_6 = 2.416$ | $n_4 = 1.651$ | $\nu_4 = 56.2$ |
| $r_7 = -3.288$ | | |
| $d_7 = 0.573$ | $n_5 = 1.6445$ | $\nu_5 = 40.8$ |
| $r_8 = 3.736$ | | |
| $d_8 = 2.617$ | $n_6 = 1.43389$ | $\nu_6 = 95.2$ |
| $r_9 = -4.388$ | | |
| $d_9 = 0.044$ | | |
| $r_{10} = 4.798$ | | |
| $d_{10} = 0.475$ | $n_7 = 1.71852$ | $\nu_7 = 33.5$ |
| $r_{11} = 2.662$ | | |
| $d_{11} = 2.445$ | $n_8 = 1.43389$ | $\nu_8 = 95.2$ |
| $r_{12} = -3.571$ | | |
| $d_{12} = 0.438$ | $n_9 = 1.5213$ | $\nu_9 = 52.6$ |
| $r_{13} = 101.671$ | | |
| $d_{13} = 0.044$ | | |
| $r_{14} = 2.436$ | | |
| $d_{14} = 1.606$ | $n_{10} = 1.497$ | $\nu_{10} = 81.6$ |
| $r_{15} = -5.282$ | | |
| $d_{15} = 1.412$ | $n_{11} = 1.5213$ | $\nu_{11} = 52.6$ |
| $r_{16} = 1.249$ | | |
| $d_{16} = 0.912$ | | |
| $r_{17} = -1.370$ | | |
| $d_{17} = 0.376$ | $n_{12} = 1.6968$ | $\nu_{12} = 56.5$ |
| $r_{18} = 3.782$ | | |
| $d_{18} = 1.518$ | $n_{13} = 1.5927$ | $\nu_{13} = 35.3$ |
| $r_{19} = -2.100$ | | |
| $f = 1,$ | $\beta = -60,$ | $NA = 1.4$ |
| $1/f_2 = -0.0765,$ | $1/f_B = -0.0835,$ | $WD = 0.043$ | wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{13}$ denote refractive indices of the respective lens elements, the reference symbols $\nu_1$ through $\nu_{13}$ represent Abbe's numbers of the respective lens elements, the reference symbol $\beta$ designates magnification level of said objective lens system as a whole and the reference symbol WD denotes working distance of said objective lens system as a whole.

* * * * *